Nov. 6, 1923.  1,473,221
W. J. ENDTER
SCARIFIER
Filed Jan. 3, 1922
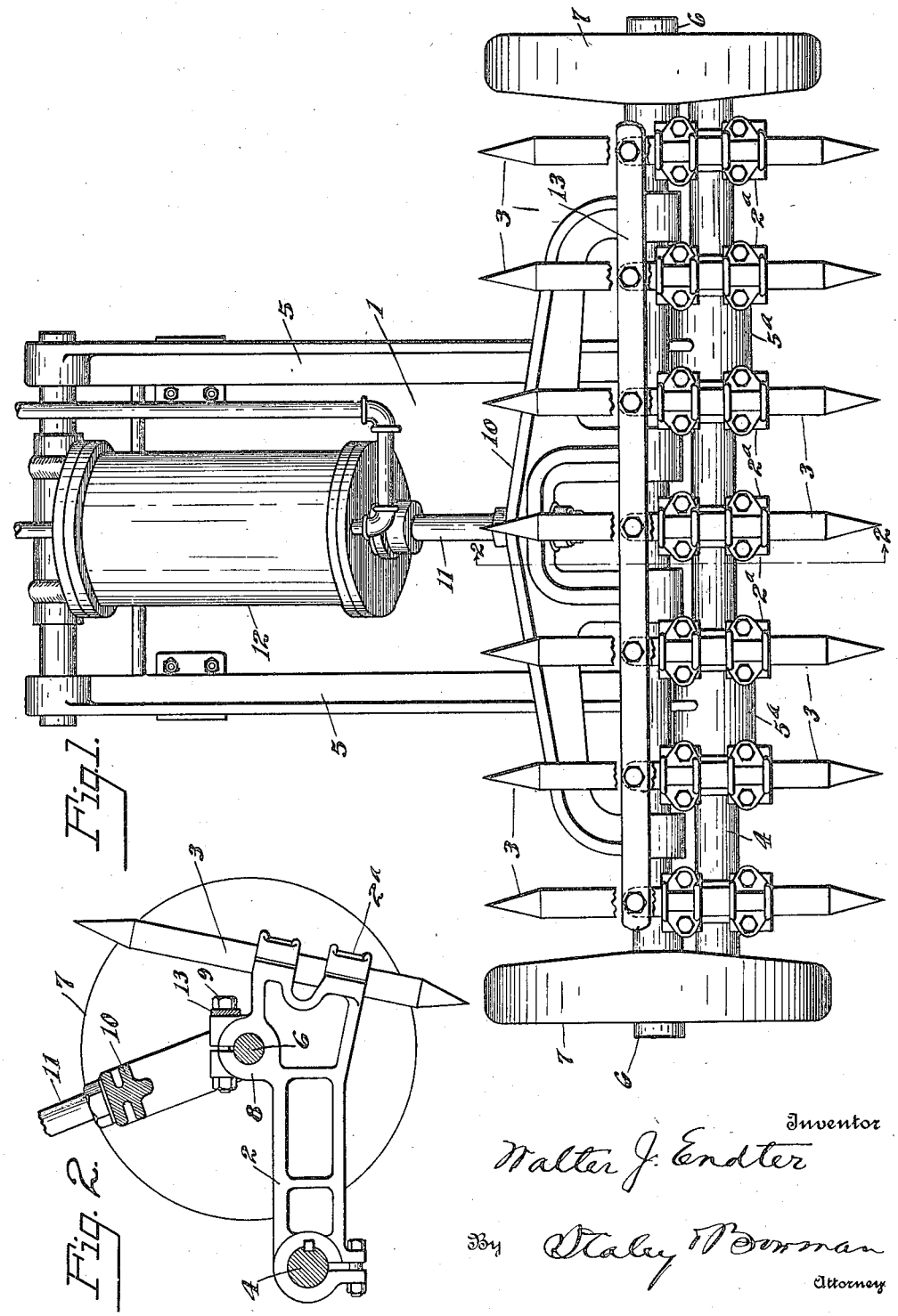

Patented Nov. 6, 1923.

1,473,221

UNITED STATES PATENT OFFICE.

WALTER J. ENDTER, OF SPRINGFIELD, OHIO, ASSIGNOR TO THE BUFFALO-SPRINGFIELD ROLLER COMPANY, OF SPRINGFIELD, OHIO, A CORPORATION OF OHIO.

SCARIFIER.

Application filed January 3, 1922. Serial No. 526,623.

*To all whom it may concern:*

Be it known that I, WALTER J. ENDTER, a citizen of the United States, residing at Springfield, in the county of Clark and State of Ohio, have invented certain new and useful Improvements in Scarifiers, of which the following is a specification.

My invention relates to improvements in scarifiers, it particularly relating to that type of scarifier which employs a series of independent scarifying tools, such for instance, as shown in the patent to H. D. Jones No. 1,226,528 dated May 15, 1917.

The object of my invention is to devise an arrangement to prevent sidewise movement of the tools under working conditions.

In the accompanying drawings:—

Fig. 1 is an end view of a scarifier embodying my improvements; the scarifying tools being partly broken away at one point.

Fig. 2 is a section on the line 2—2 of Fig. 1.

The particular form of scarifier shown in the drawing is one which is applied as an attachment to the rear end of the tank 1 of a road roller and consists of a series of tool holding bars 2 to the rear end of each of which is clamped by caps 2ª a tool 3 of usual form. The forward ends of the tool holders are keyed to a draft bar 4 which is rotatably mounted in bearing 5ª carried by the lower ends of frame members 5 which are suitably connected with the tank 1 as shown in the prior patent referred to. The tool holding bars are also connected with a shaft 6 which extends transversely across the entire series of bars and has on each end thereof a gauge wheel 7; each of the bars 2 having an integrally formed upwardly projecting split collar 8, through which the shaft 6 extends, a bolt 9 being employed to clamp the collar to the shaft in the fashion shown in the prior patent. A yoke member 10 is pivoted on the shaft 6 and is connected with the rod 11 of a piston in the cylinder 12 which cylinder is pivotally supported from the upper ends of the frame parts 5 in the manner described in the patent referred to; these devices being for the purpose of raising and lowering and applying pressure to the scarifying tools.

Regardless of the connections with the draft bar 4 and shaft 6 it has been found that these tool holding bars have a tendency to spring sidewise in meeting obstructions due to the fact that in the course of time the connections become more or less worn and loose and also to the inherent yielding of the metal. To overcome this difficulty there is employed a bar 13 extending transversely across the entire series of tool holding bars and connected therewith. The preferable manner of connecting the bar is to clamp the same to the rear sides of the ears 8 by the bolts 9.

By this construction no one of the tools and its holder can move sideways without dragging the entire series of tools and holders with it which is impossible under ordinary working conditions.

Having thus described my invention, I claim:

In a device of the character described, a series of pivoted tool holding bars, each of said bars having an integrally formed split collar, and a shaft extending across the entire series of bars and through said collars, means for clamping said collars to said shaft, and a tie bar extending across the entire series of tool holding bars and secured to said collars by said clamping means.

In testimony whereof, I have hereunto set my hand this 17th day of December, 1921.

WALTER J. ENDTER.